UNITED STATES PATENT OFFICE.

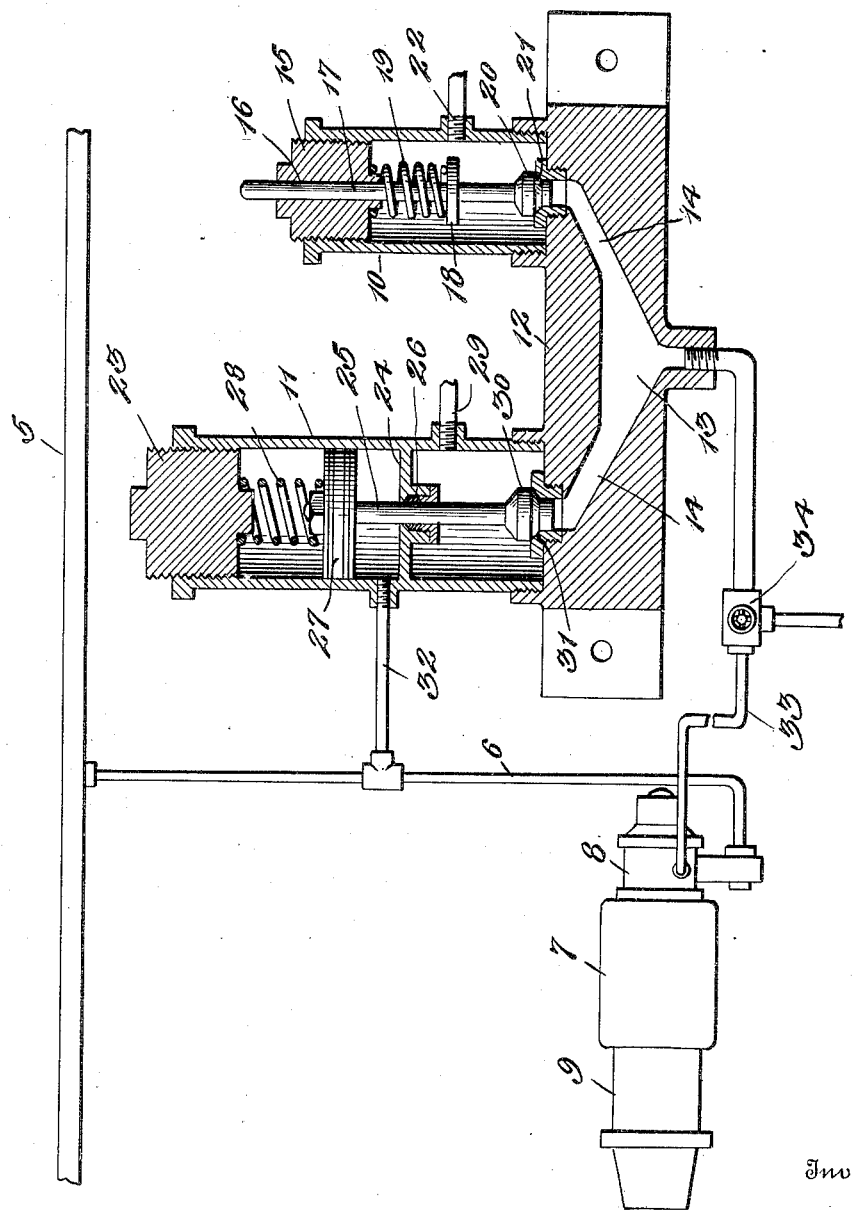

WILLIAM A. TALLEY, OF SAYRE, OKLAHOMA.

RETAINING-VALVE FOR AIR-BRAKE SYSTEMS.

1,097,375.     Specification of Letters Patent.     Patented May 19, 1914.

Application filed May 15, 1912. Serial No. 697,568.

*To all whom it may concern:*

Be it known that I, WILLIAM A. TALLEY, a citizen of the United States, residing at Sayre, in the county of Beckham and State of Oklahoma, have invented certain new and useful Improvements in Retaining-Valves for Air-Brake Systems, of which the following is a specification, reference being had to the accompanying drawings.

This invention relates to retaining valves for air brake systems and has for its primary object to provide an adjustable valve whereby any desired train line and auxiliary cylinder air pressures may be maintained in the system.

Another object of the invention is to provide a device of the above character including a releasing and retaining valve structure supplied by a common duct which is connected by a pipe to the brake cylinder, one of said valves acting to retain a predetermined air pressure in said cylinder, and a pipe connection between the other valve and the train line pipe whereby the cylinder pressure is automatically reduced upon the increase of the pressure in the train line.

Still another object of the invention is to provide a valve for the above specified purpose which may be utilized in connection with the air brake systems now in common use without materially increasing the cost of installation.

With the above and other objects in view as will become apparent as the description proceeds, the invention consists in certain constructions, combinations and arrangements of the parts that I shall hereinafter fully describe and claim.

In the accompanying drawing, wherein I have illustrated the preferred embodiment of the invention, the figure represents my improved valve structure and the connections between the same and the train line pipe and auxiliary pressure cylinder, the retaining and release valves being shown in section.

Referring in detail to the drawing 5 designates the train line pipe of an air brake system and 6 the connecting pipe between the train line pipe and an auxiliary pressure cylinder 7, said connection being effected through the ordinary triple valve 8 at the end of the auxiliary cylinder. The brake cylinder which is supplied from the auxiliary pressure cylinder is indicated by the numeral 9.

The improved valve forming the subject matter of the present application consists of a pressure retainer generally indicated by the numeral 10 and the release valve indicated at 11. The casings of these retaining and release valves are mounted upon a base plate 12 which is adapted to be attached to the body of a car in any preferred manner. This base structure is provided with a duct or passage 13 having branches 14 leading to the lower ends of the valve cylinders. The casing of the retaining valve is internally threaded at its upper end and is provided with an adjustable head 15 engaged therein. This head has a central longitudinal bore 16 through which the valve stem 17 is loosely disposed. This stem is provided upon its intermediate portion with an annular flange 18 between which and the lower end of the head 15 a coil spring 19 is arranged. The lower end of the stem 17 is provided with a valve 20 for engagement with a removable seat 21 arranged in the end of the branch supply passage 14. The valve casing of the retainer is also provided with an exhaust port indicated at 22. The release valve casing is also internally threaded at its upper end to receive an adjustable head 23. This casing is provided intermediate of its ends with a wall 24, having a central opening through which the valve stem 25 is loosely disposed. A packing box indicated at 26 is arranged upon the under side of this wall and upon the upper end of the valve stem a piston head 27 is secured. Between this head and the adjustable head 23 in the valve casing a coil spring 28 is disposed. This valve casing is also provided with an exhaust port 29, the lower end of the stem 25 has a valve 30 thereon for engagement with a removable seat 31 arranged in the other of the branch supply passages 14. A pipe 32 connects the interior of the releasing valve above the wall 24 with the auxiliary supply pipe 6 and supplies air to the valve case between the piston 27 and said wall 24.

A flexible pipe 33 connects the common supply duct 13 with the exhaust port of the triple valve 8 and in this pipe a three way valve 34 is arranged by means of which the connection between the retainer and the triple valve 8 may be cut off at any time should it become necessary.

The operation of the device may be effected by two different methods. The pressure of air necessary to lift the valve 30 from its seat is first regulated by the adjustment of the head 23 to set the release valve to sustain less than the train line pressure. In order to release the brakes, the engineer after applying the brakes in the manner of the present air brake system, moves the brake valve handle to running position and allows the same to remain in such position until the train line is recharged within a few pounds of the pressure at which the releasing valve is set. The engineer's valve handle is placed in the lap position so that the valve is held upon its seat until it is desired to release the brakes. By simply moving the valve handle to its release position, the pressure at which the valve 30 has been set by the adjustment of the head 23 is overcome by the air pressure beneath the piston 27 so that the air escapes through the port 29 and thereby releases the brakes. The device may also be operated by setting the releasing valve 30 to sustain a pressure of two or three pounds greater than the normal train line pressure. In this condition of the device, the engineer after applying his brakes as under the present system, moves the brake handle to running position and recharges the train line to a pressure of approximately seventy pounds, which is the maximum. In order to release the brake cylinder pressure, the engineer's valve handle is moved to release position and remains in such position until the train line is charged above the pressure the valve 30 is set to sustain. This excess pressure is obtained from the main supply tank carried by the engine. The retaining part of the device is set by the adjustment of the head 15 to retain a high brake cylinder pressure in the brake cylinder. By providing the adjustable retaining valve, any desired pressure may be maintained in the brake cylinder by simply regulating the tension of the spring 19. If extra braking power is desired, the same may be obtained by first making an application of the brakes, this pressure being retained by means of the valve 20. The train line is then recharged to make a second application of the brakes at the desired pressure.

By means of the structure above described, a pressure sufficient to effect the application of the brakes is at all times maintained in the train line and auxiliary supply cylinder 7, and as soon as the brakes are applied, the train line is immediately recharged while the retaining valve 20 will hold the brakes in their set positions.

From the foregoing it is believed that the construction and manner of operation of my improved retaining device for air brake systems will be clearly understood. By simply adjusting the retaining and release valves, any desired pressure can be maintained in the brake cylinder and the brakes held in their applied positions while the train line pipe is being recharged. The device may be used in connection with the ordinary form of triple valve now commonly employed in air brake systems and owing to the comparatively few parts employed in its construction, it will be appreciated that the device can be produced at very small cost and readily installed for use in the ordinary system. As no changes in the construction of the brake system as now used is necessary, the cars may be readily provided with my improved retaining device without necessitating the removal of any parts thereof.

While I have above described and shown in the accompanying drawing the preferred embodiment of the invention, it will be understood that the same is susceptible of considerable modification without departing from the essential features or sacrificing any of the advantages thereof.

Having thus described the invention what is claimed is:

The combination with an air brake system including the train line pipe and brake cylinder, of a base plate adapted to be affixed to a suitable support and having formed therethrough a duct provided with diverging branches, a pipe connection between said duct and the exhaust of the brake cylinder, retaining and release valves, each of said valves including a casing secured to the base plate and in communication with one of the branches of the duct and provided with an exhaust port, a valve member in each of the casings to close communication between the same and the supply duct, the casing of the release valve having two chambers therein, a piston arranged in one of said chambers, the valve member operating in the other chamber, a stem connecting said piston and valve member, a connecting pipe between the piston chamber and the train line pipe to supply air under pressure to said chamber and move the piston to lift the valve member from its seat and release the air from the brake cylinder.

In testimony whereof I hereunto affix my signature in the presence of two witnesses.

WILLIAM A. TALLEY.

Witnesses:
 WALTER L. FRIEND,
 ERNEST D. BOGGS.